United States Patent
Yu

(10) Patent No.: US 11,375,076 B2
(45) Date of Patent: Jun. 28, 2022

(54) READING DEVICE CONVEYING AND READING ORIGINAL DOCUMENT INCLUDING A PLURALITY OF ORIGINAL SHEETS SET IN STACKED STATE AND DETECTING OCCURRENCE OF A DOUBLE-FEED OF DOUBLE-FED SHEETS

(71) Applicant: BROTHER KOGYO KABUSHIKI KAISHA, Nagoya (JP)

(72) Inventor: Lifan Yu, Nagoya (JP)

(73) Assignee: BROTHER KOGYO KABUSHIKI KAISHA, Mizuho-ku (JP)

( * ) Notice: Subject to any disclaimer, the term of this patent is extended or adjusted under 35 U.S.C. 154(b) by 0 days.

(21) Appl. No.: 17/190,296

(22) Filed: Mar. 2, 2021

(65) Prior Publication Data

US 2021/0306499 A1    Sep. 30, 2021

(30) Foreign Application Priority Data

Mar. 31, 2020    (JP) .............................. JP2020-064833

(51) Int. Cl.
*H04N 1/00*    (2006.01)
*H04N 1/387*   (2006.01)
*B41J 11/00*   (2006.01)

(52) U.S. Cl.
CPC ..... *H04N 1/00814* (2013.01); *H04N 1/00013* (2013.01); *H04N 1/00037* (2013.01);
(Continued)

(58) Field of Classification Search
None
See application file for complete search history.

(56) References Cited

U.S. PATENT DOCUMENTS 10,009,495 B2 *    6/2018    Ichimaru ............ H04N 1/00625
2011/0069359 A1 *  3/2011    Tojo .................... H04N 1/00572
                                                              358/498
(Continued)

FOREIGN PATENT DOCUMENTS

JP    2007-206572 A    8/2007
JP    2012-231398 A    11/2012
(Continued)

*Primary Examiner* — Haris Sabah
(74) *Attorney, Agent, or Firm* — Baker Botts L.L.P.

(57) ABSTRACT

In a reading device, a controller performs: detecting occurrence of a double-feed; executing a double-feed process; detecting a state of double-fed sheets; executing a first process when a command is inputted; and executing a second process when the command is not inputted. The double feed process includes: halting conveyance of an original document; and making notification of the occurrence of the double-feed. The first process performs, in accordance with the command, one of: resuming the conveyance of the original document; and quitting the conveyance of the original document. The second process performs, in accordance with a determination result, one of: resuming the conveyance of the original document; and continuing the halting and the making. The resuming is performed when the determination result indicates that the conveyance of the original document is possible. The continuing is performed when the determination result indicates that the conveyance of the original document is impossible.

14 Claims, 8 Drawing Sheets

(52) U.S. Cl.
CPC ..... *H04N 1/00082* (2013.01); *H04N 1/00411* (2013.01); *H04N 1/00811* (2013.01); *H04N 1/00824* (2013.01); *B41J 11/003* (2013.01); *H04N 1/00135* (2013.01); *H04N 1/00652* (2013.01); *H04N 1/00681* (2013.01); *H04N 1/387* (2013.01)

(56) References Cited

U.S. PATENT DOCUMENTS

| | | | | |
|---|---|---|---|---|
| 2012/0133998 | A1* | 5/2012 | Okada | H04N 1/3263 358/498 |
| 2014/0320940 | A1* | 10/2014 | Ino | H04N 1/00578 358/498 |
| 2015/0373209 | A1* | 12/2015 | Aizono | H04N 1/0057 358/498 |
| 2017/0208205 | A1* | 7/2017 | Ikeda | H04N 1/0048 |
| 2018/0086579 | A1* | 3/2018 | Andoh | B65H 5/062 |

FOREIGN PATENT DOCUMENTS

| | | |
|---|---|---|
| JP | 2015-073186 A | 4/2015 |
| JP | 2015-174400 A | 10/2015 |
| JP | 2017-128420 A | 7/2017 |

* cited by examiner

READING DEVICE CONVEYING AND READING ORIGINAL DOCUMENT INCLUDING A PLURALITY OF ORIGINAL SHEETS SET IN STACKED STATE AND DETECTING OCCURRENCE OF A DOUBLE-FEED OF DOUBLE-FED SHEETS

CROSS REFERENCE TO RELATED APPLICATION

This application claims priority from Japanese Patent Application No. 2020-064833 filed Mar. 31, 2020. The entire content of the priority application is incorporated herein by reference.

TECHNICAL FIELD

The present disclosure relates to a reading device.

BACKGROUND

Some conventional image-reading devices have been equipped with an automatic document feeder. Hereinafter, the automatic document feeder will be abbreviated as "ADF". The ADF includes a document tray in which a plurality of sheets of an original document is set in a stacked state, a pickup roller that rotates to feed the topmost sheet of the original sheets, and conveying rollers that rotate to convey the original sheet fed from the document tray onto a conveying path. While being conveyed along the conveying path, the original sheet passes over a contact glass. At this time, a contact image sensor unit disposed beneath the contact glass reads the original.

During a reading process, if the ADF does not properly separate the original sheets so that the sheets are conveyed one at a time from the document tray, a plurality of original sheets is conveyed in an overlapped condition. This issue is known as a double-feed. Reading devices have a function for detecting the occurrence of double-feeds. In order to avoid damage to the original document, most reading devices halt conveyance of the original document when a double-feed is detected so that subsequent original sheets are not fed and report the occurrence of the double-feed to the user.

SUMMARY

Under this conventional control, the reading operation is canceled or ends with an error whenever a double-feed occurs. If the user waits next to the reading device for the reading operation to complete, the user can remove original sheets from the document tray or from the conveying path in the event of a double-feed and immediately restart the reading operation for the original document. However, if the user is away from the reading device when a double-feed occurs, the user must return to the device to restart the reading operation, resulting in a lengthy operating time.

Other reading devices are configured to complete the reading of original document even when a double-feed occurs, provided that the original sheets can still be conveyed. After completion, the reading device reports that a double-feed occurred during the reading operation. With this configuration, the user must wait until the entire reading operation is complete, even if the user has noticed that a double-feed occurred during the reading operation.

In view of the foregoing, it is an object of the present disclosure to provide a reading device that can reduce wasteful waiting time while securing opportunities for the user's involvement when a double-feed occurs.

In order to attain the above and other objects, the present disclosure provides a reading device including: a conveying portion; a reader; a user interface; a timer; a memory; and a controller. The conveying portion is configured to convey an original document including a plurality of original sheets. The conveying portion is configured to feed each of the plurality of original sheets from a support member onto a conveying path and to convey each of the plurality of original sheets along the conveying path. The support member is configured to support the plurality of original sheets set in a stacked state. The reader is configured to read each of the plurality of original sheets conveyed along the conveying path to obtain sheet image data representing an original sheet image for each of the plurality of original sheets. The controller is configured to perform: (a) detecting; (b) executing; (c) detecting; (d) executing; and (e) executing. The (a) detecting detects occurrence of a double-feed in which the conveying portion conveys double-fed sheets in an overlapped condition during conveyance of the original document. The double-fed sheets are two or more original sheets included in the original document. The (b) executing executes a double-feed process in response to detecting the occurrence of the double-feed. The double-feed process includes: (b1) halting; (b2) making; and (b3) starting. The (b1) halting halts the conveyance of the original document. The (b2) making makes notification of the occurrence of the double-feed. The (b3) starting starts the timer to measure a prescribed time interval following the occurrence of the double-feed. The (c) detecting detects, in response to detecting the occurrence of the double-feed, a state of the double-fed sheets to determine whether continuation of the conveyance of the original document is possible. The (d) executing executes a first process when a command is inputted through the user interface within the prescribed time interval. The first process performs, in accordance with the command, one of: (d1) resuming; and (d2) quitting. The (d1) resuming resumes the conveyance of the original document to continue reading of the original document. The (d2) quitting quits the conveyance of the original document. The (e) executing executes a second process when the command is not inputted through the user interface within the prescribed time interval. The second process performs, in accordance with a determination result in (c), one of: (e1) resuming; and (e2) continuing. The (e1) resuming resumes the conveyance of the original document to continue the reading of the original document. The (e1) resuming is performed in a case where the determination result in (c) indicates that the conveyance of the original document is possible. The (e2) continuing continues the (b1) halting and the (b2) making. The (e2) continuing is performed in a case where the determination result in (c) indicates that the conveyance of the original document is impossible.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, an embodiment of the present disclosure will be described in detail while referring to the accompanying drawings.

<Multifunction Peripheral>

Figure 1:
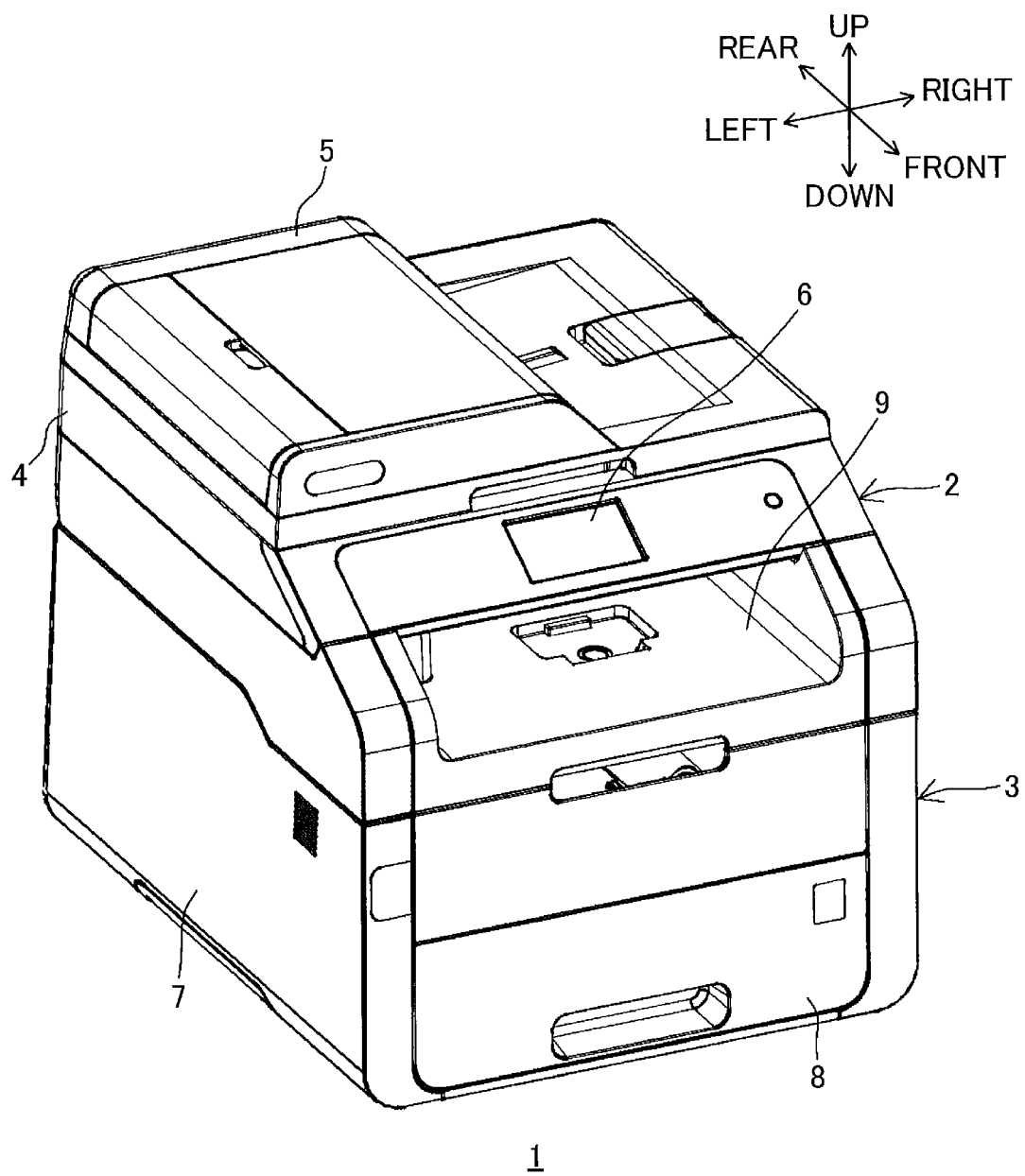
FIG. 1 illustrates a perspective view of a multifunction peripheral provided with a reading device according to one embodiment of the present disclosure.

FIG. 1 illustrates a multifunction peripheral 1. Hereinafter, the multifunction peripheral will be abbreviated as "MFP". The MFP 1 is an electronic apparatus having a plurality of functions including a reading function and a printing function. With the reading function, the MFP 1 reads an original document or the like and generates image data from the original document. With the printing function, the MFP 1 prints an image on paper based on image data. The MFP 1 is provided with a reading device 2 for implementing the reading function, and a printing device 3 for implementing the printing function.

The reading device 2 is stacked on top of the printing device 3. The reading device 2 is provided with a casing 4, and an original cover 5. The original cover 5 is disposed so as to be displaceable between an open position and a closed position. The top surface of the casing 4 is exposed when the original cover 5 is in the open position and is covered by the original cover 5 when the original cover 5 is in the closed position. An operating panel 6 is also provided on the casing 4.

In the following description, the front, rear, left, and right sides of the MFP 1 are defined on the basis of the perspective of a user facing the front of the MFP 1. The front side of the MFP 1 is defined as the side in which the operating panel 6 is disposed. The top and bottom of the MFP 1 are defined on the basis of the state of the MFP 1 resting on a level surface.

The printing device 3 is provided with a casing 7, a feed tray 8, and a discharge tray 9. The feed tray 8 is configured to be insertable into and removable from the casing 7 through the front side. The feed tray 8 is configured to be capable of supporting a plurality of sheets in a stacked state. The discharge tray 9 is formed on the top surface of the casing 7. Sheets in the feed tray 8 are fed one at a time into the casing 7 and are discharged into the discharge tray 9. An image is formed on the sheets in color or monochrome while the sheets are conveyed through the casing 7. While there are no particular restrictions, the method of printing may be an electrophotographic method or an inkjet method.

<Structure of the Reading Device>

Figure 2:
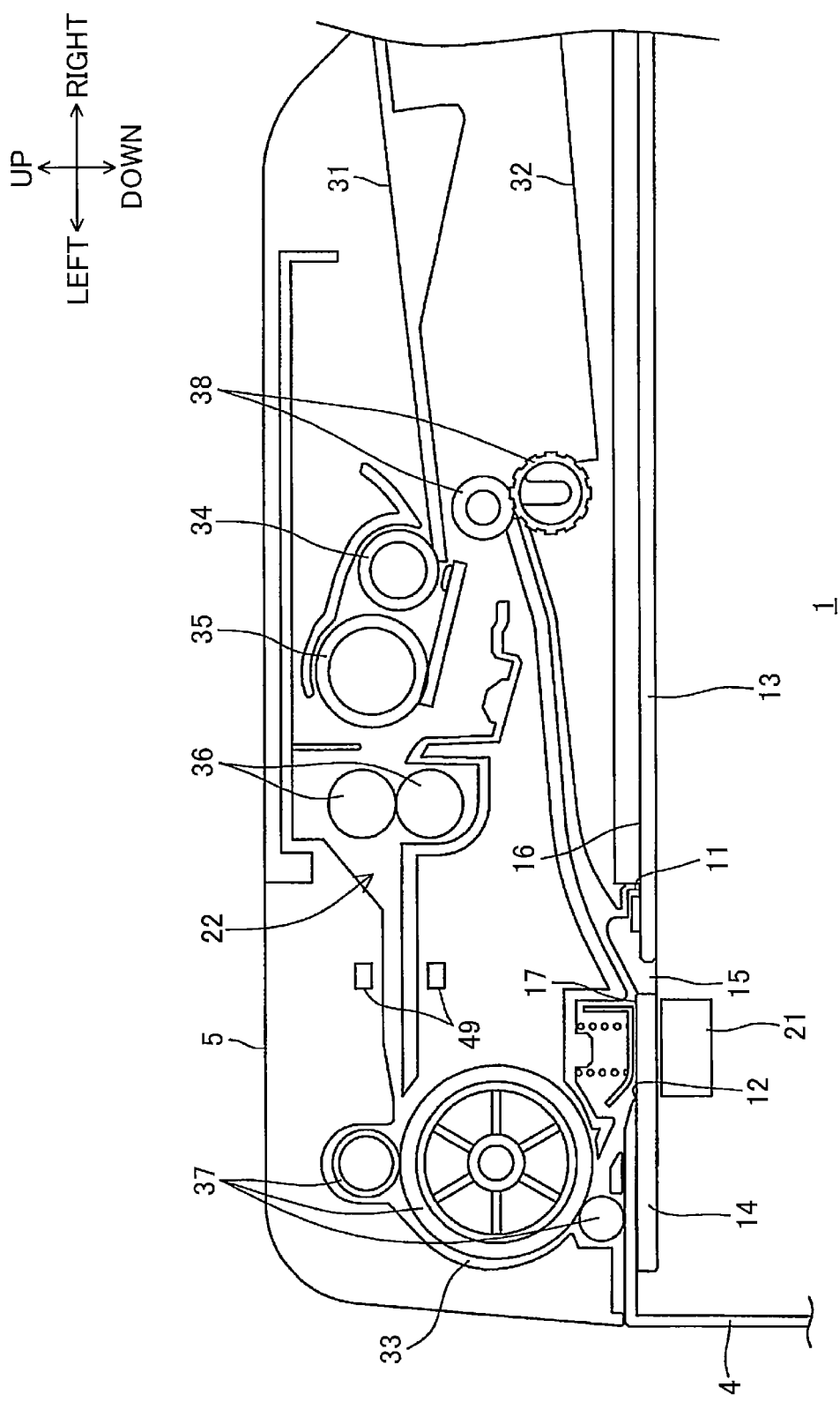
FIG. 2 is a sectional view illustrating an internal structure of the reading device according to the embodiment of the present disclosure.

The casing 4 of the reading device 2 is a molded resin product formed in the general shape of a rectangular parallelepiped. As illustrated in FIG. 2, a first opening 11 and a second opening 12 are formed in the top surface of the casing 4. The first opening 11 is rectangular in shape having edges extending in the front-rear and left-right directions and is longer in the left-right direction than the front-rear direction. The second opening 12 is also rectangular in shape with edges extending in the front-rear and left-right directions. The second opening 12 is formed on the left side of the first opening 11 and is a long narrow opening elongated in the front-rear direction.

An original platen 13 is disposed in the casing 4 so as to cover the first opening 11 from below. The original platen 13 is a plate-shaped member formed of a transparent material such as a flat glass plate. The original platen 13 is enclosed in a portion of the casing 4 surrounding the first opening 11 and retained by this peripheral portion.

An original contact plate 14 is provided in the casing 4 so as to cover the second opening 12 from below. The original contact plate 14 is a flat plate formed of a transparent material, such as a glass plate. The original contact plate 14 is enclosed in a portion of the casing 4 surrounding the second opening 12 and is retained by the front, rear, and left portions of this peripheral portion.

The portion of the casing 4 between the first opening 11 and second opening 12 serves as a guide part 15 for guiding an original sheet when the original sheet is being conveyed. The right end of the guide part 15 is formed with a flat surface extending in the front-rear and vertical directions, and a top surface that slopes upward to the right.

The reading device 2 is capable of reading original documents according to both a flatbed method and an ADF method. The top surface of the original platen 13 constitutes an original placement surface 16 that supports original sheets being scanned according to the flatbed method. The guide part 15 serves as a guide for positioning the original sheet on the original placement surface 16. Specifically, an original sheet is arranged on the original placement surface 16 such that the left edge of the original sheet contacts the guide part 15 from the right side and the rear edge of the original sheet contacts the forward-facing edge of the first opening 11. The top surface of the original contact plate 14 is an original contact surface 17 over which an original sheet passes when being scanned according to the ADF method. The guide part 15 functions as a guide for guiding the conveyance of an original sheet in the ADF method. Specifically, after passing over the original contact surface 17, the original sheet is conveyed along the top surface of the guide part 15.

A contact image sensor unit 21 (an example of the reader of the present disclosure) is disposed inside the casing 4 and can move in a sub scanning direction beneath the original platen 13 and original contact plate 14. Hereinafter, the contact image sensor unit will be abbreviated as "CIS unit". In the present embodiment, the sub scanning direction is the left-right direction of the MFP 1 illustrated in FIGS. 1 and 2. The CIS unit 21 is internally provided with a light source, a rod lens array, an image sensor, and the like. The image sensor is a linear image sensor configured of a plurality of photoelectric conversion elements arrayed in the main scanning direction. The CIS unit 21 is oriented so that its main scanning direction is aligned with the front-rear direction. The light source of the CIS unit 21 irradiates light onto the reading target, and the reflected light from the reading target passes through the rod lens array and is incident on the image sensor. Each of the photoelectric conversion elements in the image sensor convert the incident light into electric signals and output the electric signals. By converting these electric signals to image data, the CIS unit 21 completes the reading of one line in the main scanning direction.

An ADF 22 is integrally provided on the original cover 5. The ADF 22 is provided with a feed tray 31 (an example of the support member of the present disclosure), and a discharge tray 32. The feed tray 31 and discharge tray 32 are provided in a vertically stacked state with a gap formed between the two. A conveying path 33 (an example of the conveying path of the present disclosure) is formed inside the ADF 22. One end of the conveying path 33 is open above one end of the feed tray 31 in the sub scanning direction, while the other end is open between the feed tray 31 and discharge tray 32. The conveying path 33 extends leftward from the first end, follows a U-shaped curve to return in the rightward direction, and passes over the original contact surface 17 before reaching the second end. Disposed inside the ADF 22 along this conveying path 33 in order from the first end to the second end are a feed roller 34 (an example of the conveying portion of the present disclosure), a separating roller 35 (an example of the conveying portion of the present disclosure), conveying rollers 36 (an example of the conveying portion of the present disclosure), inverting rollers 37 (an example of the conveying portion of the present disclosure), and discharge rollers 38 (an example of the conveying portion of the present disclosure).

To read an original sheet according to the flatbed method, the user rotates the original cover 5 to the open position and places the original sheet on the original placement surface 16. Next, the user rotates the original cover 5 to the closed position so that the original cover 5 covers the top of the original sheet. When the user issues a command to execute a scan, the CIS unit 21 is moved from an origin position to a position corresponding to the reading start position at the head of the scanning region. From this reading start position, the CIS unit 21 is subsequently moved in the sub scanning direction while sequentially reading the original sheet on the original placement surface 16 one line at a time in the sub scanning direction until the entire original sheet has been read.

To read an original document according to the ADF method, on the other hand, the user sets the original document in the feed tray 31 of the ADF 22. At this time, the CIS unit 21 remains stationary at a position confronting the bottom of the original contact plate 14. When the user issues a command to execute the scan, the feed roller 34 begins conveying the original document into the ADF 22. When the original document includes a plurality of original sheets, the separating roller 35 separates the original sheets so that only one original sheet is fed at a time, and the conveying rollers 36 and inverting rollers 37 convey the original sheet along the conveying path 33. As the original sheets pass over the original contact surface 17, the CIS unit 21 repeatedly reads one line at a time until the entire original document has been read.

<Electrical Configuration of the Reading Device>

Figure 3:
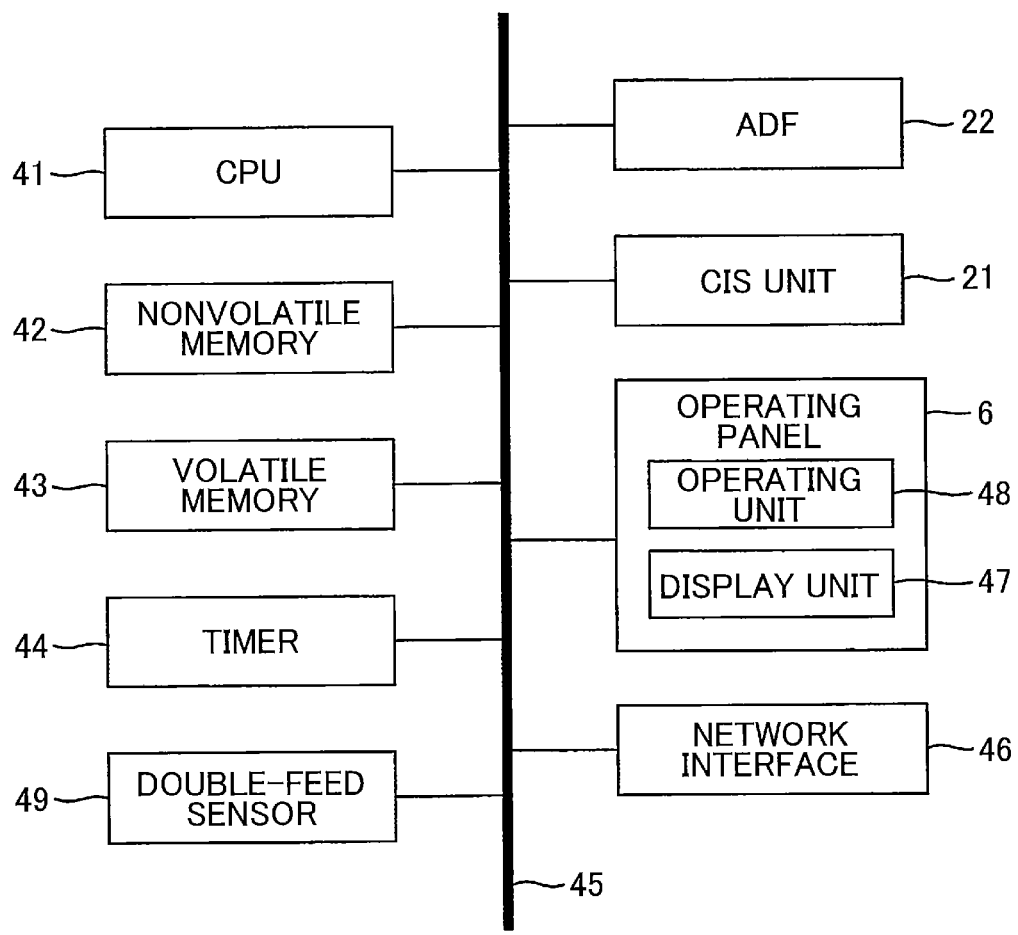
FIG. 3 is a block diagram illustrating an electrical configuration of the reading device according to the embodiment of the present disclosure.

As illustrated in FIG. 3, the reading device 2 is provided with a central processing unit (CPU) 41, a nonvolatile memory 42 such as a flash memory or an E²PROM to which data is writable, a volatile memory 43 such as an SDRAM, and a timer 44. The CPU 41, nonvolatile memory 42, volatile memory 43, and timer 44 are interconnected via a bus 45 that enables data communications.

By executing a program for implementing various processes, the CPU 41 (an example of the controller of the present disclosure) controls control targets. Control targets include the operating panel 6, CIS unit 21, and ADF 22, as well as a network interface 46 and the like connected to the bus 45.

The operating panel 6 is a touchscreen configured by overlaying an operating unit 48 on a display unit 47. The display unit 47 is a liquid crystal display or the like. The operating unit 48 is configured of resistive or capacitive transparent film switches or the like. Various information and images of operating keys or the like are displayed on the display unit 47. When the user touches an operating key displayed on the display unit 47, the operating unit 48 receives a touch operation for that operating key and inputs a signal corresponding to the touch operation into the CPU 41.

The network interface 46 functions to implement data communications with an external device such as a personal computer (PC) via a local area network (LAN). The network interface 46 may implement a wireless communication method or a wired communication method.

The nonvolatile memory 42 stores programs executed by the CPU 41 and various data, for example.

The volatile memory 43 is used as a work area when the CPU 41 executes programs.

The timer 44 is a counter that counts a clock supplied from a clock module (not illustrated) in order to track elapsed time.

A double-feed sensor 49 is also connected to the bus 45. As illustrated in FIG. 2, the double-feed sensor 49 employed in the embodiment is configured with an ultrasonic oscillation unit that oscillates ultrasonic waves, and an ultrasonic reception unit that receives the ultrasonic waves. The ultrasonic oscillation unit and ultrasonic reception unit are disposed between the conveying rollers 36 and inverting rollers 37 and oppose each other from opposites sides of the conveying path 33. Which of the ultrasonic oscillation unit and ultrasonic reception unit is provided on which side does not matter, provided that one is disposed on each opposing side.

When an original document is present between the two units of the double-feed sensor 49, the ultrasonic waves transmitted from the ultrasonic oscillation unit to the ultrasonic reception unit are attenuated according to the thickness of the original sheet or, in the event of a double-feed, the presence of a plurality of original sheets being conveyed in an overlapped state. Consequently, the voltage (analog signal) outputted from the ultrasonic reception unit changes. Through A/D conversion of the analog signal outputted from the ultrasonic reception unit, i.e., the detection signal of the double-feed sensor 49, the CPU 41 acquires a double-feed sensor signal value (a digital value). According to this double-feed sensor signal value, the CPU 41 can detect the occurrence of a double-feed since the double-feed sensor signal value changes according to the thickness of the original sheet, the occurrence of a double-feed, and the like.

<Reading Process>

The CPU 41 executes a reading process in order to read an original document according to the ADF method. Steps in the reading process are indicated in FIGS. 4A, 4B, 4C, and 4D.

In S1 of the reading process, the CPU 41 determines whether a batch output mode has been set. The batch output mode is set internally when the user has specified a function that accumulates a scanned image (data) obtained when the CIS unit 21 reads an original document and outputs the scanned image (data) all at once. Examples of functions that set the batch output mode internally in the MFP 1 may be a file output function that consolidates scanned images for a plurality of pages and transmits data of the consolidated scanned images to an external device or the like, and a sorted copy function that consolidates scanned images for a plurality of pages, collates the scanned images, and prints a plurality of copies. Functions that set the batch output mode may be selected through an operation on the operating panel 6 or a command inputted from an external device.

If the batch output mode has been set (S1: YES), in S2 the CPU 41 sets a batch output flag in the volatile memory 43 to ON. However, if the batch output mode has not been set (S1: NO), in S3 the CPU 41 sets the batch output flag to OFF.

After S2 or S3, in S4 the CPU 41 resets the count value for a user-absent double-feed counter in the volatile memory 43 to zero. The user-absent double-feed counter maintains a count of double-feeds that occur while the user is away from the MFP 1. The count value of the user-absent double feed counter is an example of the count value of the present disclosure.

In S5 the CPU 41 begins reading the original document set in the feed tray 31 of the ADF 22. When the CPU 41 initiates a reading operation, one original sheet of the original document set in the feed tray 31 is conveyed into the conveying path 33.

After initiating the reading operation, in S6 the CPU 41 determines whether a double-feed has been detected according to the detection signal from the double-feed sensor 49.

If a double feed was detected (S6: YES), in S7 the CPU 41 sets a double-feed flag in the 43 to ON. The double-feed flag is reset to zero at the start of a reading process. In S8 the CPU 41 stores the page position of the double-fed original sheets (hereinafter called the "double-fed pages") in the volatile memory 43. Here, "page position" denotes the position of the pages in relation to the rest of the pages in the original document. The page position is not limited to this, but may denote the number of pages that had been read by the time when a double-feed error occurred. Instead, the page position may denote the number of remaining pages to be read in S21 of FIG. 4C (described later) after the CPU 41 detected a double-feed (S6: YES). In S9 the CPU 41 conveys the double-fed pages a prescribed distance until at least a portion of the pages has been read by the CIS unit 21.

Figure 4A:
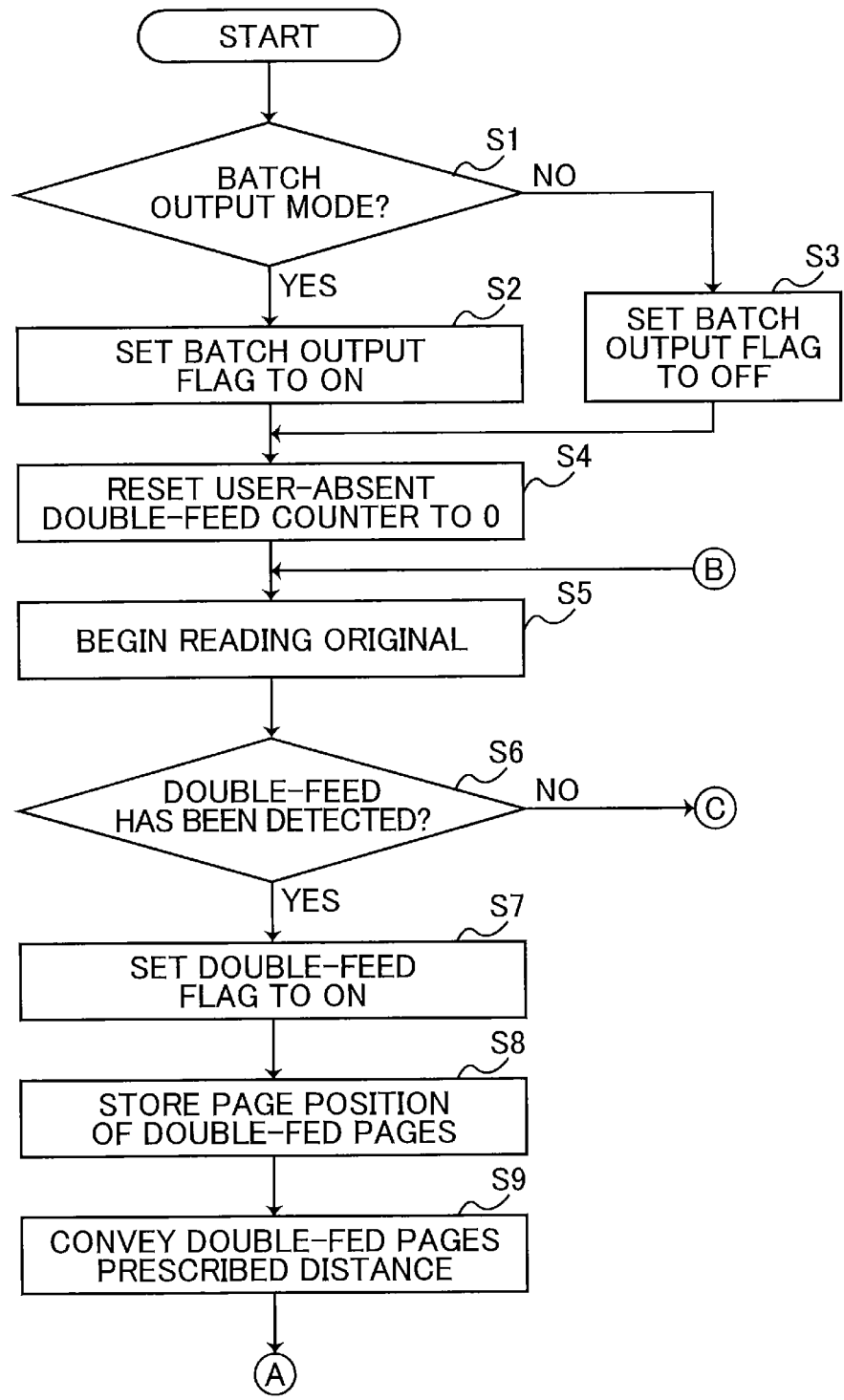
FIG. 4A is a flowchart illustrating the first part of steps in a reading process executed by a CPU of the reading device according to the embodiment of the present disclosure.
Figure 4B:
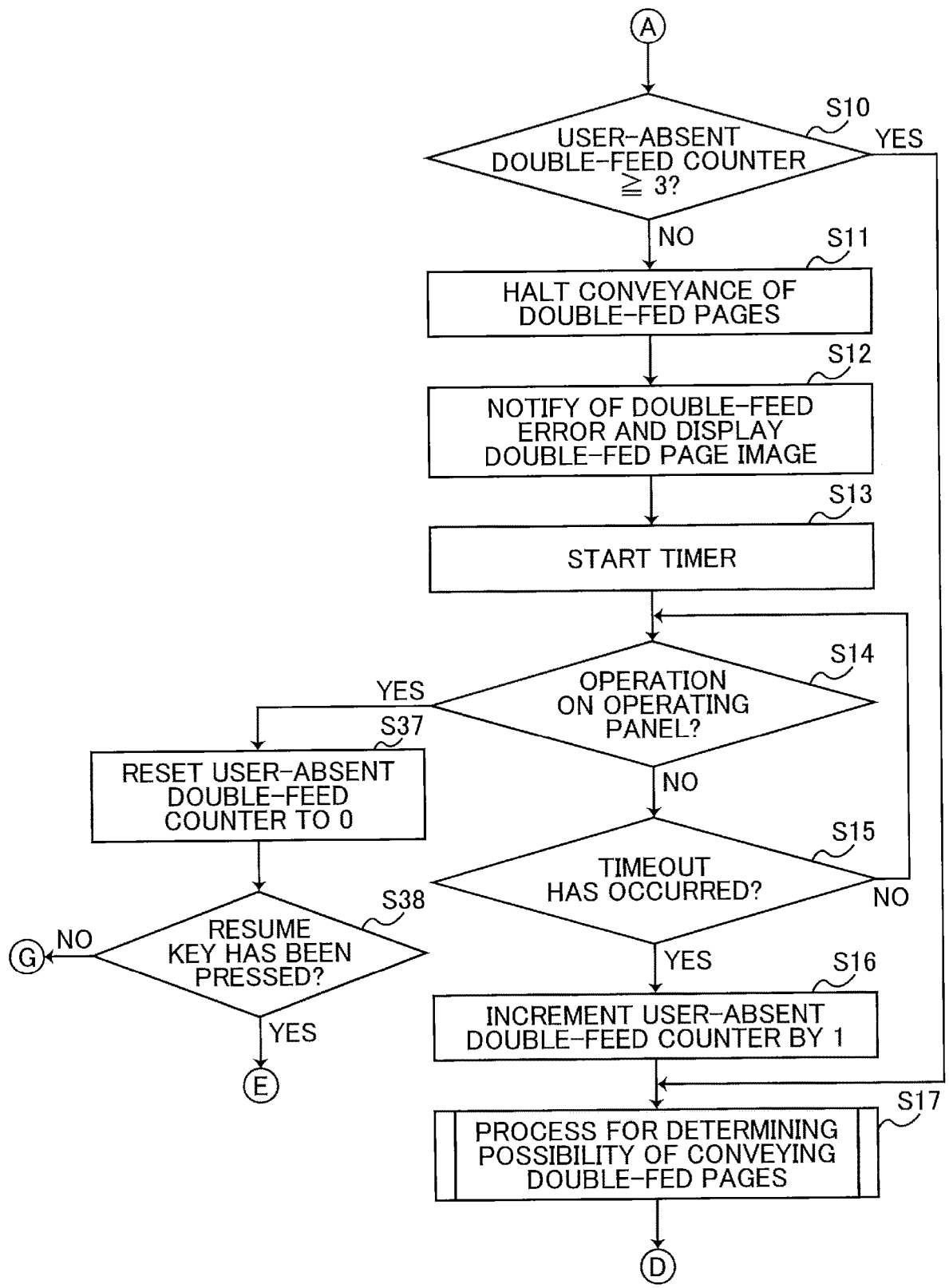
FIG. 4B is a flowchart illustrating the second part of the steps in the reading process executed by the CPU of the reading device according to the embodiment of the present disclosure.

In S10 of FIG. 4B, the CPU 41 determines whether the count value of the user-absent double-feed counter is three or greater while continuing to convey the double-fed pages. If the count value for the user-absent double-feed counter is less than three (S10: NO), in S11 the CPU 41 halts conveyance of the double-fed pages. In S12 the CPU 41 displays a message on the operating panel 6 (the display unit 47) indicating that a double-feed error has occurred and displays a scanned image of at least a portion of the double-fed pages (double-fed page image) on the operating panel 6. Note that notification of the double-feed error may be performed by outputting a special sound signifying an error.

In S13 the CPU 41 starts the timer 44 to begin measuring a fixed time interval following notification of the double-feed error. In S14 the CPU 41 determines whether the user performed an operation on the operating panel 6 (the operating unit 48). While an operation has not been performed on the operating panel 6 (S14: NO), in S15 the CPU 41 determines whether a timeout has occurred. Here, a timeout indicates that the timer 44 has completed measuring the fixed time interval. If a timeout has not yet occurred (S15: NO), the CPU 41 returns to S14 and repeats the determination for an operation on the operating panel 6.

If a timeout occurs before an operation was performed on the operating panel 6 (S15: YES), in S16 the CPU 41 increments the count value of the user-absent double-feed counter by one. In S17 the CPU 41 executes a process to determine the possibility of conveying double-fed pages (process for determining the possibility of conveying double-fed pages). This process will be described later in detail.

Figure 4C:
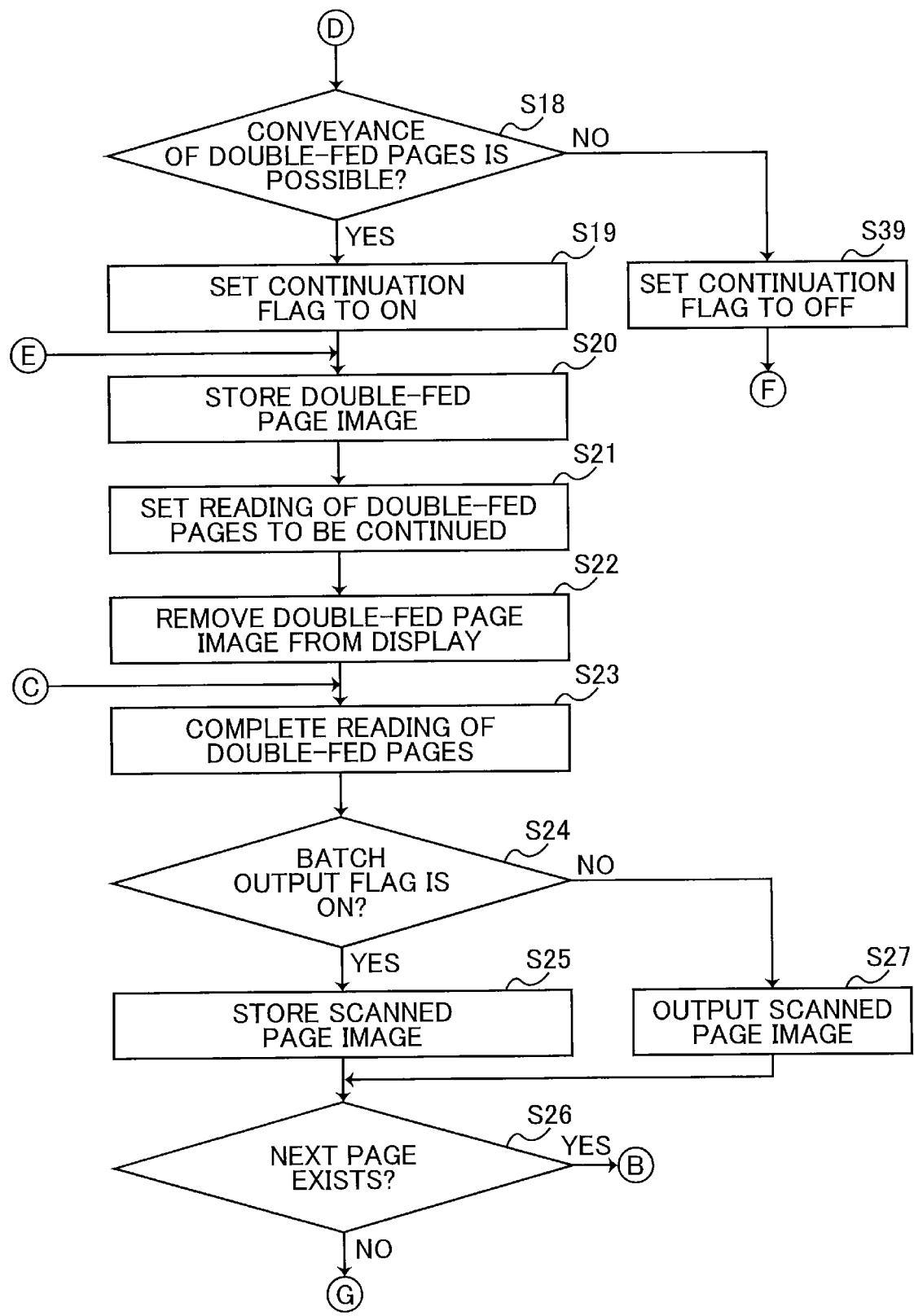
FIG. 4C is a flowchart illustrating the third part of the steps in the reading process executed by the CPU of the reading device according to the embodiment of the present disclosure.
Figure 4D:
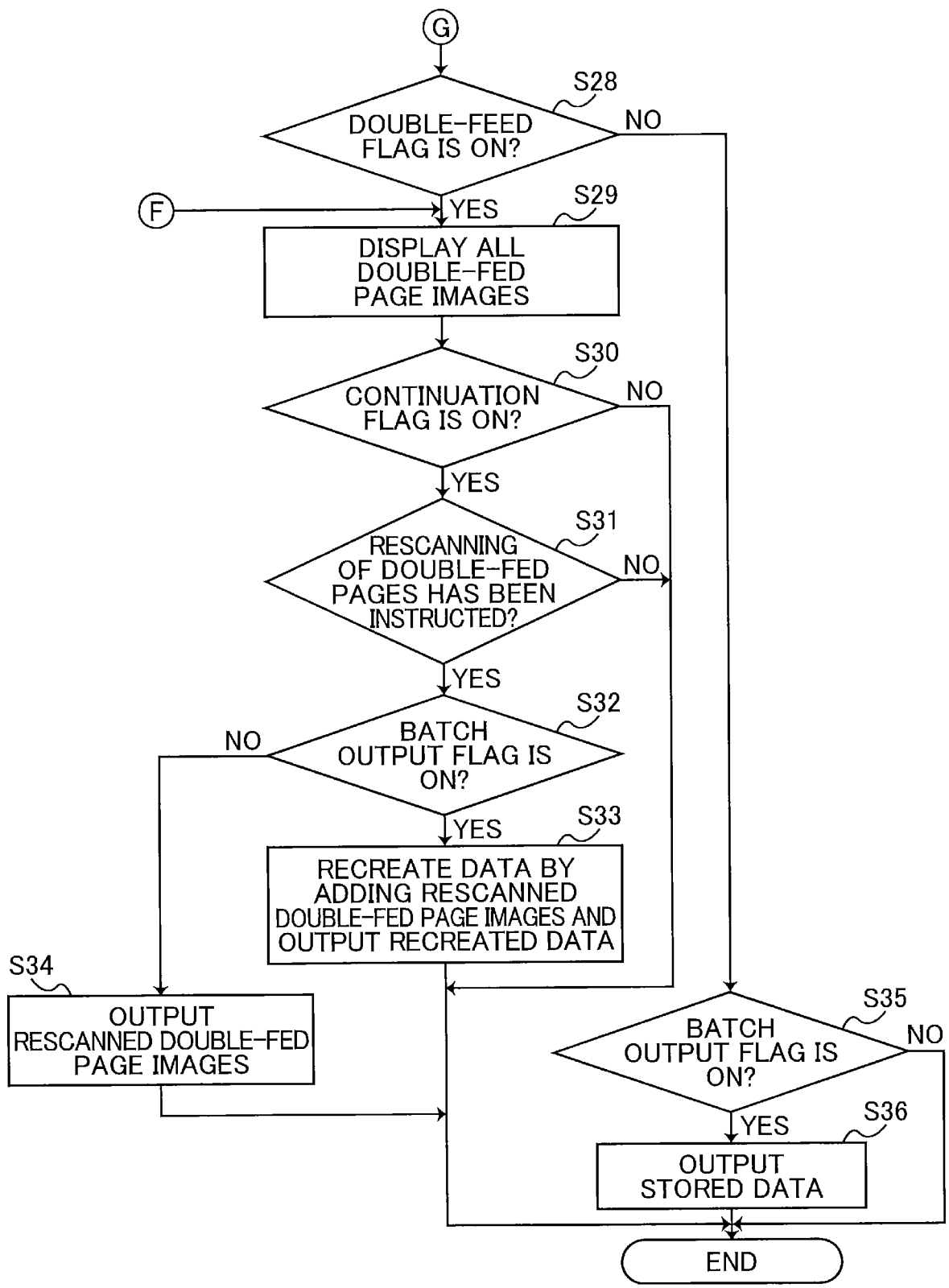
FIG. 4D is a flowchart illustrating the fourth part of the steps in the reading process executed by the CPU of the reading device according to the embodiment of the present disclosure.

In S18 of FIG. 4C, the CPU 41 determines whether conveyance of the double-fed pages was determined to be possible in the process of S17. If the CPU 41 determines that conveyance is possible (S18: YES), in S19 the CPU 41 sets a continuation flag in the volatile memory 43 to ON. In S20 the CPU 41 stores the scanned image of the double-fed pages in the volatile memory 43. In S21 the CPU 41 sets reading of the double-fed pages to be continued, and in S22 removes the double-fed page image from the display on the operating panel 6.

In S23 the CPU 41 completes reading of the double-fed pages. Once reading is complete, in S24 the CPU 41 determines whether the batch output flag is set to ON. If the batch output flag is ON (S24: YES), in S25 the CPU 41 stores image data representing an image of the scanned double-fed pages (scanned page image) in an output buffer allocated in the volatile memory 43 since image data representing each of scanned images must be outputted altogether, and in S26 determines whether a next page of the original document exists. On the other hand, if the batch output flag is OFF (S24: NO), in S27 the CPU 41 outputs image data representing an image of the scanned double-fed pages and in S26 determines whether a next page of the original document exists. To determine whether a next page of the original document exists, an original sensor may be provided for detecting the presence of an original sheet in the feed tray 31. In this case, the CPU 41 may determine whether a next page exists according to a detection signal outputted from the original sensor. Hereinafter, storing image data representing an image will be also simply referred to as storing an image, and outputting image data representing an image will be also simply referred to as outputting an image.

If a next page exists (S26: YES), the CPU 41 returns to S5 of FIG. 4A and begins reading the next page of the original document.

On the other hand, if a next page of the original document does not exist (S26: NO), in S28 of FIG. 4D the CPU 41 determines whether the double-feed flag is set to ON. The double-feed flag is set to ON when a double-feed occurs while reading an original document configured of a plurality of pages (original sheets) and remains OFF when a double-feed has not occurred.

If the double-feed flag is ON (S28: YES), in S29 the CPU 41 displays scanned images on the operating panel 6 of all double-fed pages (all double-fed page images) involved in double-feeds while reading the original document. In S30 the CPU 41 determines whether the continuation flag is ON. If the continuation flag is OFF (S30: NO), the CPU 41 ends the reading process. If the continuation flag is ON (S30: YES), in S31 the CPU 41 determines whether the user has performed an operation on the operating panel 6 instructing that the double-fed pages be rescanned. At this time, the operating panel 6 includes a display of scanned images for all double-fed pages and a Rescan key instructing that the double-fed pages be rescanned, for example. The CPU 41 determines that a command to rescan the double-fed pages was issued when the Rescan key was pressed. If the Rescan key has not been pressed within a prescribed time interval (S31: NO), the CPU 41 ends the reading process.

When the user retrieves all double-fed pages from the discharge tray 32, returns the pages to the feed tray 31, and selects the command to rescan the double-fed pages (S31: YES), in S32 the CPU 41 determines whether the batch output flag is ON. If the batch output flag is ON (S32: YES), in S33 the CPU 41 rescans all double-fed pages, recreates data by adding scanned images for all of the rescanned double-fed pages (rescanned page images) at the position of the double-fed pages in the scanned image stored in the output buffer of the volatile memory 43, and outputs the recreated data. Subsequently, the CPU 41 ends the reading process. However, if the batch output flag is OFF (S32: NO), in S34 the CPU 41 rescans all double-fed pages and sequentially outputs the scanned images for the rescanned double-fed pages. Subsequently, the CPU 41 ends the reading process.

Further, if the CPU 41 determines that a next page of the original document does not exist (S26: NO) and that the double-feed flag is OFF (S28: NO), in S35 the CPU 41 determines whether the batch output flag is ON. If the batch output flag is ON (S35: YES), in S36 the CPU 41 outputs the scanned image (stored data) since a scanned image was stored in the output buffer of the volatile memory 43, and subsequently ends the reading process. However, if the batch output flag is OFF (S35: NO), the CPU 41 simply ends the reading process.

Further, if the CPU 41 does not detect the occurrence of a double-feed after initiating a reading operation for a page of the original document in S5 of FIG. 4A (S6: NO), the CPU 41 advances to S23 in FIG. 4C and finishes reading the page. In S24 the CPU 41 determines whether the batch output flag is ON. If the batch output flag is ON (S24: YES), in S25 the CPU 41 stores an image of the scanned page (scanned page image) in the output buffer allocated in the volatile memory 43 and in S26 determines whether a next page of the original exists. However, if the batch output flag is OFF (S24: NO), in S27 the CPU 41 outputs an image of the scanned page and in S26 determines whether a next page of the original document exists.

Alternatively, if the CPU 41 detected a double-feed (S6: YES in FIG. 4A) and the user performed an operation on the operating panel 6 in S14 within the fixed time interval following notification of the double-feed error (S14: YES in FIG. 4B), in S37 the CPU 41 resets the count value for the user-absent double-feed counter to zero. In S38 the CPU 41 determines whether a Resume key or a Quit key displayed on the operating panel 6 together with the scanned image of the double-fed pages has been pressed. If the Resume key was pressed (S38: YES), in S20 of FIG. 4C the CPU 41 stores the scanned image of the double-fed pages in the volatile memory 43, in S21 sets reading of the double-fed pages to be continued, and in S22 removes the double-fed page image from the display on the operating panel 6. The subsequent process is identical to that described above.

On the other hand, if the Quit key was pressed (S38: NO), in S28 of FIG. 4D the CPU 41 determines whether the double-feed flag is ON. When the double-feed flag is ON (S28: YES), in S29 the CPU 41 displays the scanned images of all double-fed pages on the operating panel 6. However, if the double-feed flag is OFF (S28: NO), the CPU 41 outputs the scanned image stored in the output buffer of the volatile memory 43 (stored data) in S36 if the batch output flag is ON (S35: YES) before ending the reading process, or simply ends the reading process if the batch output flag is OFF (S35: NO).

Alternatively, if the CPU 41 detected a double-feed in S6 of FIG. 4A (S6: YES) and determined in S18 of FIG. 4C that conveyance of the double-fed pages is not possible (S18: NO), in S39 the CPU 41 sets the continuation flag to OFF. Subsequently, in S29 of FIG. 4D, the CPU 41 displays the scanned images for all double-fed pages on the operating panel 6. The subsequent process is identical to that described above.

Alternatively, if a double-feed of original sheets occurs repeatedly while the user is away from the MFP 1 until the count value of the user-absent double-feed counter reaches three or greater (S10: YES in FIG. 4B), in S17 the CPU 41 immediately executes the process to determine whether it is possible to convey the double-fed pages (process for determining the possibility of conveying double-fed pages). The subsequent process is identical to that described above.

Note that the determinative count value of the user-absent double-feed counter for determining whether double-feeds do not occur frequently is set to three or greater in the present embodiment. However, the determinative count value is not limited to three, but may be set a prescribed value greater than two. Further, the determinative count value may be set larger to suit the type of sheets of original document or conditions in which double-feeds are more prone to occur.

Figure 5:
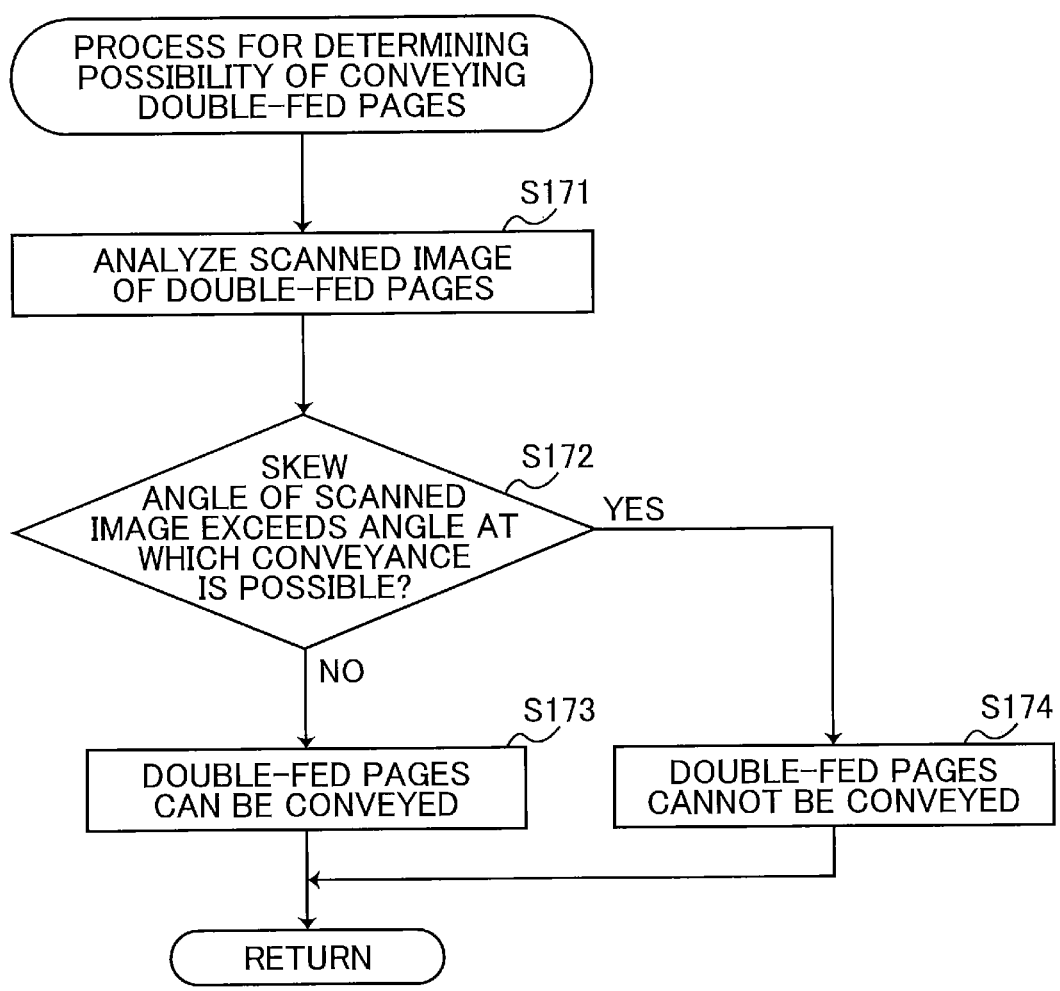
FIG. 5 is a flowchart illustrating steps in a process for determining the possibility of conveying double-fed pages executed by the CPU of the reading device according to the embodiment of the present disclosure.

Next, the process for determining the possibility of conveying double-fed pages will be described with reference to FIG. 5.

In S171 of the process for determining the possibility of conveying double-fed pages, the CPU 41 analyzes the scanned image of the double-fed pages. In S172 the CPU 41 determines whether the skew angle of the scanned image exceeds an angle at which double-fed pages can be conveyed.

When the skew angle of the scanned image for the double-fed pages does not exceed the angle at which conveyance is possible (S172: NO), in S173 the CPU 41 determines that the double-fed pages can be conveyed and returns to the reading process. However, if the CPU 41 determines that the skew angle exceeds the angle at which double-fed pages can be conveyed (S172: YES), in S174 the CPU 41 determines that the double-fed pages cannot be conveyed and returns to the reading process.

<Effects of the Embodiment>

As described above, conveyance of an original document is halted when a double-feed occurs. If a command is inputted on the operating panel 6 (the operating unit 48) within a prescribed time interval after the double-feed occurs, conveyance and reading of the original document is continued in response to this command. However, even if a command is not inputted on the operating panel 6 within the prescribed time interval after the double-feed error occurred, the position of the double-fed pages is stored in the volatile memory 43 and conveyance and reading of the original document is continued as long as conveyance of the double-fed pages is possible in the current state.

Accordingly, if the user is not near the MFP 1 at the time of the double-feed error, conveyance and reading of the original is continued as long as such conveyance is possible. Thus, the user need not rescan the entire original document after returning to the MFP 1. On the other hand, if the user is near the MFP 1 and promptly performs an operation on the operating panel when a double-feed occurs, the MFP 1 can continue conveying and reading the next page of the original document following the double-fed pages to avoid wasting time.

Further, when a double-feed has occurred, reading is completed for the original sheet preceding the double-fed pages, and the double-fed pages are conveyed a prescribed distance until at least a portion of the pages is read by the CIS unit 21. In this way, the MFP 1 can determine from the scanned image of the double-fed pages whether the double-fed pages can be conveyed.

Further, when a double-feed occurs, the MFP 1 displays a notification indicating that a double-feed error has occurred together with a scanned image of at least a portion of the double-fed pages on the operating panel 6 (the display unit 47). When made aware of the double-feed error through this notification, the user can view the display on the operating panel 6 to confirm the pages involved in the double-feed.

When the MFP 1 has determined that reading of the double-fed pages will be continued, the MFP 1 removes the scanned image of at least a portion of the double-fed pages from the operating panel 6, so that the scanned image is not continuously displayed.

Further, if another double-feed occurs, the MFP 1 displays a scanned image on the operating panel 6 for at least a portion of the double-fed pages included in this other double-feed. Hence, when made aware of this double-feed error, the user can view the display on the operating panel 6 to confirm the pages involved in this other double-feed.

If a double-feed occurs in a reading operation for an original document having a plurality of pages, the MFP 1 finishes reading all pages of the original document and subsequently displays a scanned image of all double-fed pages on the operating panel 6. Consequently, the user can easily see all double-fed pages that must be rescanned by viewing the display on the operating panel 6 and can retrieve the double-fed pages from the discharge tray 32 and return them to the feed tray 31 to be rescanned.

In addition to or instead of displaying images on the operating panel 6 for all double-fed pages, the MFP 1 may display the positions of the double-fed pages stored in the volatile memory 43.

<Variations of the Embodiment>

While the description has been made in detail with reference to specific embodiments, it would be apparent to those skilled in the art that many modifications and variations may be made thereto.

For example, after displaying a scanned image on the operating panel 6 that includes at least a portion of the double-fed pages, the MFP 1 need not remove the display of this scanned image even when reading of the double-fed pages has been set for continuation. Further, if another double-feed occurs, the MFP 1 may display a scanned image on the operating panel 6 for at least a portion of the new double-fed pages in addition to the scanned image already displayed.

In the present embodiment described above, notification of the double-feed error is performed in S12 if the count value for the user-absent double-feed counter is less than the determinative count value (three, in the embodiment). However, notification of the double-feed error may be performed when the count value for the user-absent double-feed counter is greater than or equal to the determinative count value.

Further, the reading device 2 may be provided with a sensor for detecting the type of original document. For example, the reading device 2 may be provided with a sensor for detecting whether the original document is configured of plain paper or specific materials such as plastic cards and the like. Further, the reading device 2 may be provided with a sound sensor that detects the sound of contact between the original document and the casing. In these cases, notification of the double-feed error may be performed if the value outputted from the sensor reaches a level indicating that the original document is configured of specific materials.

Further, the reading device 2 may be provided with a sensor for detecting the type of original document, and the type of original document or the determinative count value of the user-absent double-feed counter may be preliminary set. In this case, the CPU 41 may perform notification of the double-feed error if the output value of the sensor indicates that the type of original document is different from the preliminary set type. Further, the CPU 41 may perform notification if the output value of the sensor indicates that the determinative count value preliminary set for the user-absent double-feed counter is not suit for the current type of original document. In other words, notification may be performed if the value outputted from the sensor indicates that the determinative count value for the user-absent double-feed counter is not suit for detecting the occurrence of a double-feed in the currently reading original document.

In the present embodiment described above, the CPU 41 executes all of the processes. However, the reading device 2 may be provided with a plurality of CPUs that work in concert to execute these processes.

It would be apparent to those skilled in the art that many modifications and variations may be made in the configuration described above without departing from the scope of which is defined by the attached claims.

What is claimed is:

1. A reading device comprising:
   a conveying portion configured to convey an original document including a plurality of original sheets, the conveying portion being configured to feed each of the plurality of original sheets from a support member onto a conveying path and to convey each of the plurality of original sheets along the conveying path, the support member being configured to support the plurality of original sheets set in a stacked state;
   a reader configured to read each of the plurality of original sheets conveyed along the conveying path to obtain sheet image data representing an original sheet image for each of the plurality of original sheets;
   a user interface;
   a timer;
   a memory; and
   a controller configured to perform:
   (a) detecting occurrence of a double-feed in which the conveying portion conveys double-fed sheets in an overlapped condition during conveyance of the original document, halting the conveyance of the original document, and making notification of the occurrence of the double-feed, the double-fed sheets being two or more original sheets included in the original document; and
   (b) executing a double-feed process in response to detecting the occurrence of the double-feed, executing a first process when a command is inputted through the user interface within a prescribed time interval, and executing a second process when the command is not inputted through the user interface within the prescribed time interval, the double-feed process comprising starting the timer to measure the prescribed time interval following the occurrence of the double-feed, the first process being performed in accordance with the command inputted through the user interface, the first process comprising: resuming the conveyance of the original document to continue reading of the original document in a case where the command instructs to resume the conveyance of the original document and quitting the conveyance of the original document in a case where the command instructs to quit the conveyance of the original document, the second process being performed in accordance with a state of the double-fed sheets, the second process comprising: resuming the conveyance of the original document to continue the reading of the original document in a case where continuation of the conveyance of the original document is determined to be possible; and continuing the halting in (a) and the making in (a) in a case where the continuation of the conveyance of the original document is determined to be impossible.

2. The reading device according to claim 1, wherein the halting in (a) halts the conveyance of the original document after an original sheet preceding the double-fed sheets is read by the reader.

3. The reading device according to claim 2, wherein the halting in (a) halts the conveyance of the original document after at least a portion of the double-fed sheets is read by the reader.

4. The reading device according to claim 3, further comprising a display,
wherein the making in (a) displays a double-fed sheet image along with the notification of the occurrence of the double-feed on the display, the double-fed sheet image being an image of the at least a portion of the double-fed sheets read by the reader.

5. The reading device according to claim 4, wherein the controller is configured to further perform:
(c) removing the double-fed sheet image from the display in response to one of the resuming of the first process and the resuming of the second process being performed.

6. The reading device according to claim 5, wherein when the detecting in (a) detects occurrence of another double-feed of other double-fed sheets after the one of the resuming of the first process and the resuming of the second process is performed, the making in (a) displays another double-fed sheet image along with notification of the occurrence of the another double-feed on the display, the another double-fed sheet image being an image of at least a portion of the other double-fed sheets read by the reader.

7. The reading device according to claim 4, wherein when the detecting in (a) detects occurrence of another double-feed of other double-fed sheets after one of the resuming of the first process and the resuming of the second process is performed, the making in (a) displays, in addition to the double-fed sheet image, another double-fed sheet image along with notification of the occurrence of the another double-feed on the display, the another double-fed sheet image being an image of at least a portion of the other double-fed sheets read by the reader.

8. The reading device according to claim 1, further comprising a display,
wherein the double-feed process further comprises
storing a double-fed sheet position in the memory, the double-fed sheet position indicating a page position of the double-fed sheets in the original document,
wherein the controller is configured to further perform:
(d) displaying on the display the double-fed sheet position stored in the memory after the plurality of original sheets included in the original document set on the support member is read by the reader.

9. The reading device according to claim 8, wherein when the detecting in (a) detects occurrence of a plurality of double-feeds, the storing of the double-feed process stores in the memory a plurality of double-fed sheet positions corresponding to respective ones of the plurality of double-feeds, and the displaying in (d) displays the plurality of double-fed sheet positions stored in the memory.

10. The reading device according to claim 1, wherein the controller is operable in a batch output mode in which document image data representing a plurality of original sheet images for respective ones of the plurality of original sheets included in the original document is outputted at once, and
wherein the controller is configured to perform in the batch output mode:
(e) storing in the memory a plurality of pieces of sheet image data representing respective ones of the plurality of original sheet images read by the reader;
(f) re-conveying and re-reading, in response to detecting the occurrence of the double-feed in (a), the double-fed sheets to obtain reread sheet image data representing a reread double-fed sheet image after the reading of the original document set on the support member is completed; and
(g) creating the document image data for the original document based on the plurality of pieces of sheet image data stored in the memory, the reread sheet image data, and the double-fed sheet position stored in the memory to output the document image data to a prescribed destination.

11. The reading device according to claim 1, wherein the memory is configured to store a count value indicating a status related to the occurrence of the double-feed,
wherein the double-feed process further comprises
acquiring the count value stored in the memory to determine whether the count value meets a notification condition, and
wherein the making in (a) is performed in response to determining that the count value meets the notification condition.

12. The reading device according to claim 11, wherein the double-feed process further comprises
incrementing the count value stored in the memory, and
wherein the acquiring in the double-feed process determines that the count value meets the notification condition when the count value is less than or equal to a threshold, the threshold being greater than two.

13. The reading device according to claim 11, wherein the count value indicates possibility that the occurrence of the double-feed has been erroneously detected, and
wherein the acquiring in the double feed process determines that the count value meets the notification condition when the possibility indicated by the count value has reached a prescribed level.

14. The reading device according to claim 11, wherein the count value indicates material of each of the plurality of original sheets,
wherein the acquiring in the double feed process determines that the count value meets the notification condition when the material indicated by the count value is unsuitable for the detecting in (a).

\* \* \* \* \*